United States Patent [19]

Nakajima et al.

[11] Patent Number: 5,099,266
[45] Date of Patent: Mar. 24, 1992

[54] RANGE METER FOR CAMERA

[75] Inventors: Yuji Nakajima; Isamu Ishii, both of Chiba, Japan

[73] Assignee: Seikosha Co., Ltd., Tokyo, Japan

[21] Appl. No.: 634,283

[22] Filed: Dec. 26, 1990

[30] Foreign Application Priority Data

Dec. 28, 1989 [JP] Japan .................. 1-343842

[51] Int. Cl.⁵ .......................................... G03B 13/36
[52] U.S. Cl. ...................................... 354/403; 356/4
[58] Field of Search ........................... 354/403; 356/4

[56] References Cited

U.S. PATENT DOCUMENTS

| | | | |
|---|---|---|---|
| 4,582,424 | 4/1986 | Kawabata | 354/403 |
| 4,688,919 | 8/1987 | Ogawa et al. | 354/403 |
| 4,954,861 | 9/1990 | Nagaoka et al. | 354/403 |
| 4,983,033 | 1/1991 | Suzuki | 354/403 |

Primary Examiner—Russell E. Adams
Attorney, Agent, or Firm—Jordan and Hamburg

[57] ABSTRACT

A range meter for a camera includes a row of light sources for propagating light to a subject from different directions, and a receiver for receiving reflected light. The receiver provides an output corresponding to a spot thereon at which light is received. The light sources are energized selectively, so that the light sources at the end of the row emit less than the light sources at the center of the row.

7 Claims, 2 Drawing Sheets

RANGE METER FOR CAMERA

FIELD OF THE INVENTION

This invention relates to a range meter for cameras.

BACKGROUND OF THE INVENTION

In automatic focusing (AF type) cameras, generally, the distance to a subject to be photographed is measured by triangulation.

In this method, an infrared beam is projected from a light projecting element toward the subject, the reflected light from the subject is received by a light receiving element, and the distance to the subject is calculated on the basis of the point of the light receiving element that receives light.

In such a method, wherein only one light projecting element is used, however, it is difficult to obtain a correct distance unless a subject to be photographed is positioned at the center of a finder. In view of such circumstances, a so-called multi automatic focusing (multi AF type) range meter is also known (see, for example, Japanese Patent Laid-Open No. 87-223734) which uses a plurality of light projecting elements. In this multi AF type range meter, a plurality of light projecting elements are arranged in a row, and they project their beams of light in different directions. The light projecting elements are controlled such that they emit light at different emission timing in time-division manner.

The irradiation beam projected from each light projecting element toward a subject to be photographed weakens as the distance to the subject increases, and thus is simply influenced by noise or variation. Therefore, conventionally, to remove the influence of noise or variation, each light projecting element is caused to emit light several times and a set of range data thus obtained is averaged. Accordingly, a conventional multi AF type range meter consumes much power.

SUMMARY OF THE INVENTION

It is an object of the present invention to reduce the amount of power consumption of a multi AF type range meter.

BRIEF DESCRIPTION OF THE DRAWINGS

An embodiment of the present invention will now be described with reference to the accompanying drawings, wherein.

DESCRIPTION OF THE PREFERRED EMBODIMENTS

Individual components will now be described with reference to FIG. 1.

IR1-IR5 are light projecting elements each made of a light emitting diode for emitting far infrared light. These light projecting elements IR1-IR5 are arranged in a row in front of a camera (not shown).

LS1 is a light projecting lens for projecting the light from each of the light projecting elements IR1-IR5 to form corresponding irradiation beams traveling in different directions.

The light projecting elements IR1-IR5 and the light projecting means LS1 constitute projecting means.

EM is a light projecting circuit acting as light-quantity control means which controls the light emission of the light projecting elements IR1-IR5.

PT is a light receiving element of a plurality of photodiodes which receive the reflected light from each of subjects SB1 and SB2 to be photographed to provide an output signal corresponding to the point in its longitudinal direction at which light is received. This light receiving element PT is disposed in front of the camera.

LS2 is a light receiving lens for focusing the reflected light from the subject on the light receiving element PT.

DT1 and DT2 are detecting circuits for detecting the output signals of the light receiving element PT.

OP is an arithmetic circuit for providing an output signal corresponding to the distance to the subject on the basis of the output signals of the detecting circuits DT1 and DT2.

AD is an A/D converting circuit for converting the output signal of the arithmetic circuit OP from analog to digital form to provide a range value.

CR is a main control circuit for controlling the whole system.

LC is a lens control circuit for controlling the position of the lens of the camera in response to the distance information from the main control circuit CR.

Figure 2:
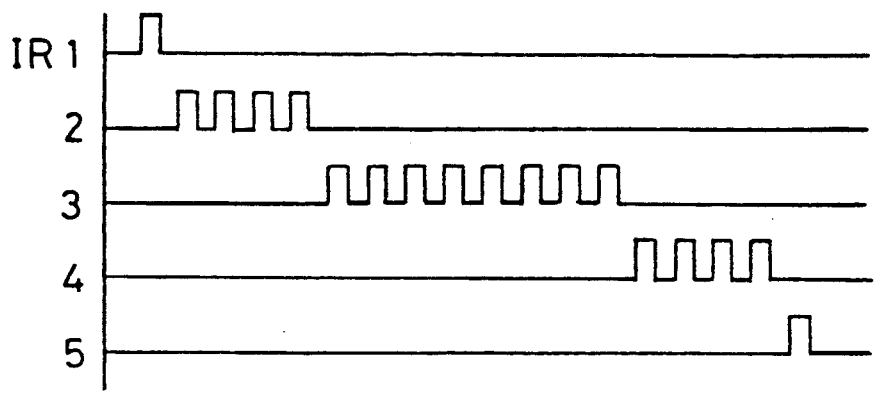
FIGS. 2 through 4 are time charts showing light projection patterns of light projecting means.
Figure 3:
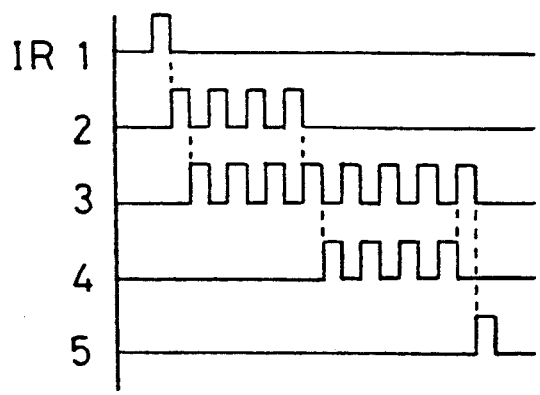
Figure 4:
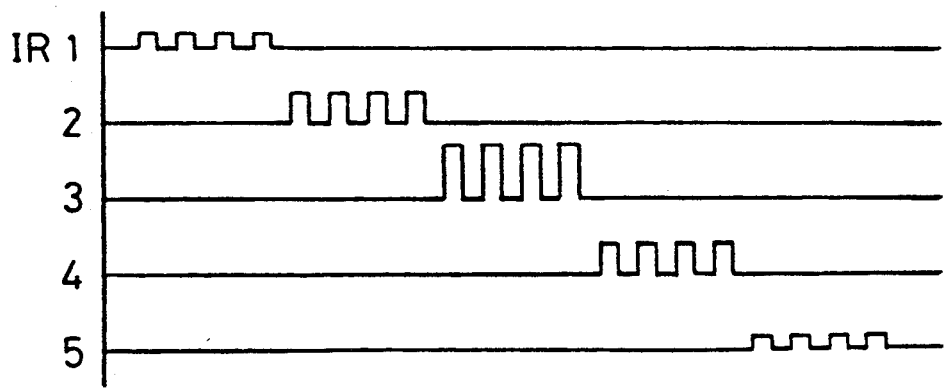

The operation of the embodiment will be described. When a release switch (not shown) is depressed, a control signal is sent from the main control circuit CR to the light projecting circuit EM, so that the light projecting elements IR1-IR5 successively emit light in time-sharing manner. FIGS. 2, 3, and 4 show light emission patterns of the light projecting elements IR1-IR5.

Figure 1:
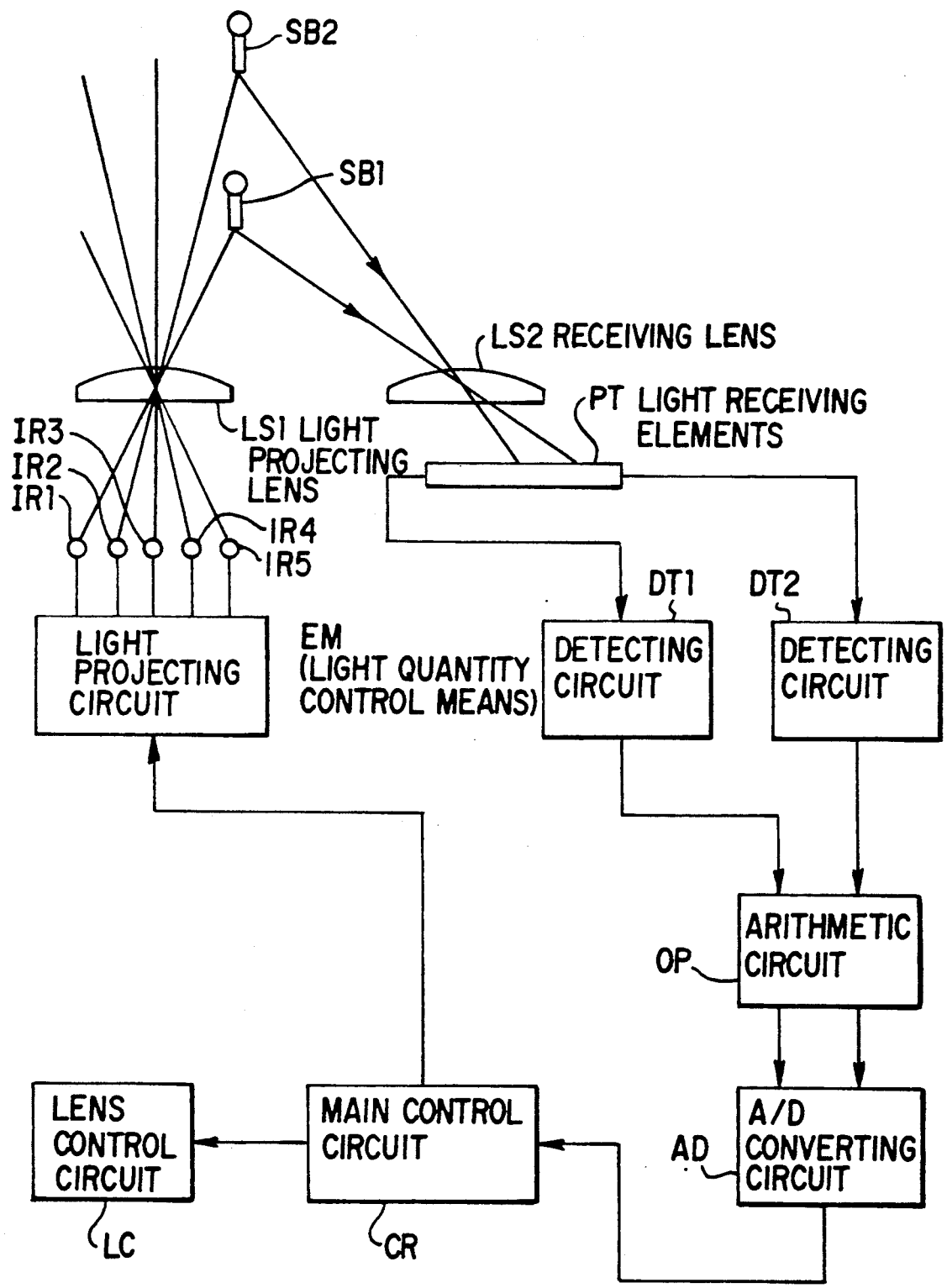
FIG. 1 is a block diagram showing an embodiment of the present invention.

Describing the relationship between the light projecting elements IR1-IR5 and the subjects SB1 and SB2, as will be appreciated from FIG. 1, among the light projecting elements, generally, marginally-arranged ones handle the distance measurement of the subject SB1 positioned close to the camera, whereas centrally-arranged ones handle the distance measurement of the subject SB2 positioned remote from the camera. When the subject is positioned close to the camera, the irradiation beam is only weakened to a small extent and impinges on the subject with sufficient intensity and thus is not influenced significantly by noise or variation. Therefore, it is possible to make the quantity of emission light of a marginally-arranged light projecting element smaller than that of a centrally-arranged one, whereby the total amount of power consumption can be reduced.

The control example of FIG. 2 is such that the number of times of light irradiation of a marginally-arranged light projecting element is smaller than that of a centrally-arranged one. That is, the total time of light irradiation of a marginally-arranged light projecting element is shorter than that of a centrally-arranged one.

The control example of FIG. 3 is such that during times when the light emission of one light projecting element is suspended, another element is caused to emit light, whereby the time interval of distance measurement can be shortened. The signals may be pulsatory as illustrated with pulses of one element being interleaved with those of another element.

The control example of FIG. 4 is such that the strength of irradiation light of a marginally-arranged light projecting element is weaker than that of a centrally-arranged element.

The control examples of FIGS. 2 through 4 may be combined.

In operation, the irradiation beams projected from the light projecting elements IR1–IR5 toward the subjects, after reflection from the subjects, are received by the light receiving element PT. The light receiving element PT provides an output signal corresponding to the point thereon in its longitudinal direction that receives light, the output signal being detected by the detecting circuits DT1 and DT2. The arithmetic circuit OP processes the output signals of the detecting circuits DT1 and DT2. Such processing is performed every time each of the light projecting elements IR1–IR5 emits light. Each calculation result is converted in the A/D converting circuit AD from analog to digital form and then sent to the main control circuit CR as a range value. In the main control circuit CR, a set of range data in digital form corresponding to each of the light projecting elements IR1–IR5 is averaged, and the smallest value among the thus averaged values is considered as a real distance value. That is, where there are a plurality of subjects in relation to the light projecting elements IR1–IR5, the distance to the subject positioned most close to the camera is chosen. The lens control circuit LC controls the position of the lens of the camera on the basis of the distance data given from the main control circuit CR.

In this way, focusing is automatically made to the subject positioned closest to the camera.

The multi AF type range meter according to the invention is made such that the quantity of irradiation light of a marginally-arranged light projecting means is smaller than that of a centrally-arranged one; therefore, the amount of power consumption can be reduced as compared with the conventional multi AF type range meter.

Further, where the number of times of light irradiation of a marginally-arranged light projecting means is made smaller than that of a centrally-arranged one, the total time for making a distance measurement can be shortened.

Although the present invention has been described through specific terms, it should be noted here that the described embodiment is not necessarily exclusive and that various changes and modifications may be imparted thereto without departing from the scope of the invention which is limited solely by the appended claims.

What we claim is:

1. A range meter for cameras comprising a plurality of light projecting means arranged in a row for projecting irradiation beams toward a subject to be photographed, whereby the row has centrally-arranged light projecting means that are closer to the center of the row than marginally-arranged light projecting means, light receiving means for receiving the reflected light from the subject irradiated with the irradiation beams to provide an output signal corresponding to a point on the receiving means at which light is received, arithmetic means for calculating the distance to the subject on the basis of the output signal of the light receiving means, and light-quantity control means for controlling the light projecting means to direct a lesser amount of irradiation light from a marginally-arranged light projecting means than from a centrally-arranged light projecting means.

2. A range meter for cameras according to claim 1, wherein the light-quantity control means comprises means for controlling the light projecting means to emit a lower intensity of irradiation light from a marginally-arranged light projecting means than from a centrally-arranged light projecting means.

3. A range meter for cameras according to claim 1, wherein the light-quantity control means comprises means for controlling the light projecting means to emit a smaller number of light irradiation pulses from a marginally-arranged light projecting means than from a centrally-arranged light projecting means.

4. A range meter for cameras according to claim 1, wherein the light-quantity control means comprises means for controlling the light projecting means to emit light irradiation from a marginally-arranged light projecting means for a shorter interval than from a centrally-arranged light projecting means.

5. A range meter for a camera comprising a row of a plurality of light sources arranged to direct irradiation light in different directions to a subject to be photographed, means for receiving reflected light responsive to reflection of said irradiation beam from the subject, whereby the position at which light is received on said receiving means is a function of the direction that the beam of light if propagated and the distance between the projecting means and subject, said receiving means comprising means for providing an output that is a function of the position on said receiving means that said reflected light is received, means coupled to said receiving means for calculating said distance in response to the output of said receiving means, and means for selectively energizing first ones of said light sources to direct a smaller quantity of light than second ones of said light sources, said first light sources being closer to the ends of said row than said second light sources.

6. The range meter of claim 5, wherein said means for selectively energizing said light sources comprises means for energizing said sources to emit light pulses, with said second light sources being energized to emit a greater number of pulses than said first light sources.

7. The range meter of claim 6, wherein said means for selectively energizing said light sources comprises means for controlling said light sources to interleave a light pulse emitted from one light source with light pulses emitted from another of said light sources.

* * * * *